United States Patent [19]

Ogawa et al.

[11] Patent Number: 5,249,102
[45] Date of Patent: Sep. 28, 1993

[54] PORTABLE ELECTRIC DEVICE WITH SLIDING SWITCH COVER

[75] Inventors: Yoshio Ogawa; Kouzou Takahashi; Hitoshi Isoda, all of Kanagawa; Toshio Arai, Tokyo, all of Japan

[73] Assignee: Sony Corporation, Tokyo, Japan

[21] Appl. No.: 926,030

[22] Filed: Aug. 7, 1992

[30] Foreign Application Priority Data

Aug. 14, 1991 [JP] Japan .................. 3-228660

[51] Int. Cl.⁵ .................. H05K 5/03; B65D 43/20
[52] U.S. Cl. .................. 361/392; 361/814; 220/348
[58] Field of Search .................. 312/223.1, 319.1; 220/242, 345–349; 174/67; 361/380, 390–395, 399, 415; 206/305, 320

[56] References Cited

U.S. PATENT DOCUMENTS

| 2,980,484 | 4/1961 | Pifer .................. 220/345 X |
| 4,804,238 | 2/1989 | Bischof et al. .................. 220/348 X |
| 4,928,204 | 5/1990 | Wang .................. 361/380 X |

FOREIGN PATENT DOCUMENTS

| 167363 | 12/1954 | Australia .................. 220/345 |
| 3608057 | 9/1987 | Fed. Rep. of Germany ...... 361/415 |

OTHER PUBLICATIONS

Owner's Manual for GE Camcorder CG-9906/CG-9908, copyright 1989, Thomson Consumer Electronics, Inc., Part Number 1Q56 200-01A, Cover Page, pp. 6, 14, 35, and rear cover page.

Primary Examiner—Leo P. Picard
Assistant Examiner—Michael W. Phillips
Attorney, Agent, or Firm—Lewis H. Eslinger; Jay H. Maioli

[57] ABSTRACT

A portable electronic device, such as a portable sound reproducing device, a portable sound recording/reproducing device, a portable radio receiver or a portable video tape recorder, comprising a case containing an electronic circuit assembly and having a front panel, a plurality of operating buttons for operating control switches for controlling the electronic circuit assembly, supported on the front panel is provided with a sliding cover assembly slidably provided on the front panel and capable of being shifted between a first position to cover the operating buttons and a second position to expose the operating buttons. The sliding cover assembly is retained at the first position by a retaining mechanism to prevent the accidental operation of the operating buttons.

6 Claims, 8 Drawing Sheets

PORTABLE ELECTRIC DEVICE WITH SLIDING SWITCH COVER

BACKGROUND OF THE INVENTION

1. Field of the Invention

The present invention relates to a portable electronic device, such as a portable recording device, a portable reproducing device, a portable recording/reproducing device or a portable radio receiver.

2. Description of the Prior Art

Compact, portable electronic devices, such as portable recording/reproducing devices and portable radio sets, have been proposed. The main unit of such a portable electronic device is formed in a size fitting, for example, the breast pocket of a dress shirt. Such a portable electronic device has a plurality of control buttons for controlling the operation of the portable electronic device, arranged on the case of the main unit. The operating buttons are, for operating, for example, a reproduction switch, a stop switch, a fast feed switch, a rewinding switch, channel selector switches and the like, which, in general, are push-button switches. The operating buttons of the push-button switches are pushed selectively to control the portable electronic device for a desired operation.

When the portable electronic device is carried in the breast pocket of the dress shirt or the like while the portable electronic is used, it is possible that the operating buttons are pushed accidentally and the portable electronic device performs an unexpected operation or a desired operation of the portable electronic device is interrupted.

To obviate such troubles attributable to the accidental depression of the operating buttons of the control switches, the portable electronic device is provided with a toggle switch or a slide switch as a hold switch to hold the existing state of the circuits of the portable electronic device. When the key of the hold switch is set at a hold position, the portable electronic device is set in a hold state, in which the operation of the operating switches of the portable electronic device is invalid and the existing state of the portable electronic device is maintained even if the operating switches are operated.

However, it is difficult to recognize visually the condition of the hold switch of the portable electronic device; that is, since the main unit of the portable electronic device and the operating unit of the same are very small, the slide key of the hold switch is shifted between a hold position and a nonhold position, which are close to each other, and hence it is difficult to recognize the position of the slide key. Accordingly, in recognizing the position of the key of the hold switch of the portable electronic device, it often occurs that the portable electronic device in the nonhold state is considered mistakenly to be in the hold state, which causes troubles due to accidental or erroneous operation of the operating switches.

Although increase in the size of the key of the hold switch will enable easy recognition of the condition of the hold switch, increase in the size of the key entails increase in the size of the main unit of the portable electronic device, which may possibly spoil the portability of the portable electronic device.

SUMMARY OF THE INVENTION

The present invention has been made in view of the foregoing problems in the prior art portable electronic devices and it is therefore an object of the present invention to provide a portable electronic device capable of distinctly indicating a hold state in which operations to be executed when control switches are operated are not executed even if the operating buttons of the control switches are pushed.

The present invention provides a portable electronic device comprising a case containing an electronic circuit assembly and having a front panel, a plurality of operating buttons for operating control switches for controlling the electronic circuit assembly, supported on the front panel, the improvement comprising: a sliding cover assembly slidably provided on the front panel, provided with a pair of guide pins, and capable of being shifted between a first position to cover the operating buttons and a second position to expose the operating buttons; a guide plate provided with a pair of guide grooves for guiding the guide pins of the sliding cover assembly, extending along the sliding direction of the sliding cover assembly; and a retaining means for retaining the sliding cover assembly at the first position or the second position.

Since the pair of guide pins provided on the sliding cover assembly are guided by the guide grooves in shifting the sliding cover assembly between the first position and the second position, the sliding cover assembly is able to slide smoothly without tilting from the sliding direction. Since the sliding cover assembly is retained by the retaining means at the first position or the second position, the sliding cover assembly is never shifted accidentally or carelessly from the first position to the second position or vice versa.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

A portable electronic device in a preferred embodiment according to the present invention is a sound reproducing device.

Figure 1:
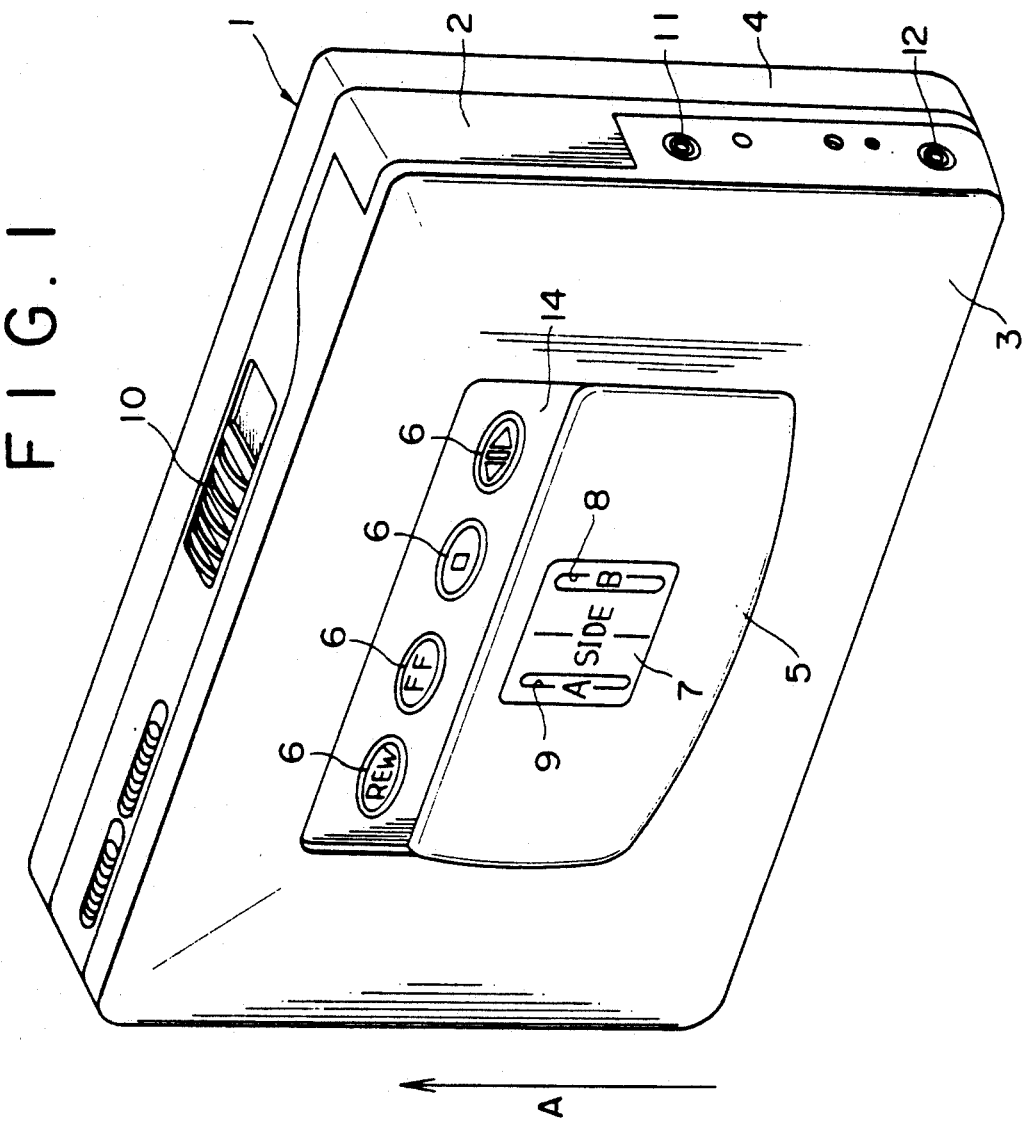
FIG. 1 is a perspective view of a portable electronic device in a preferred embodiment according to the present invention.
Figure 8:
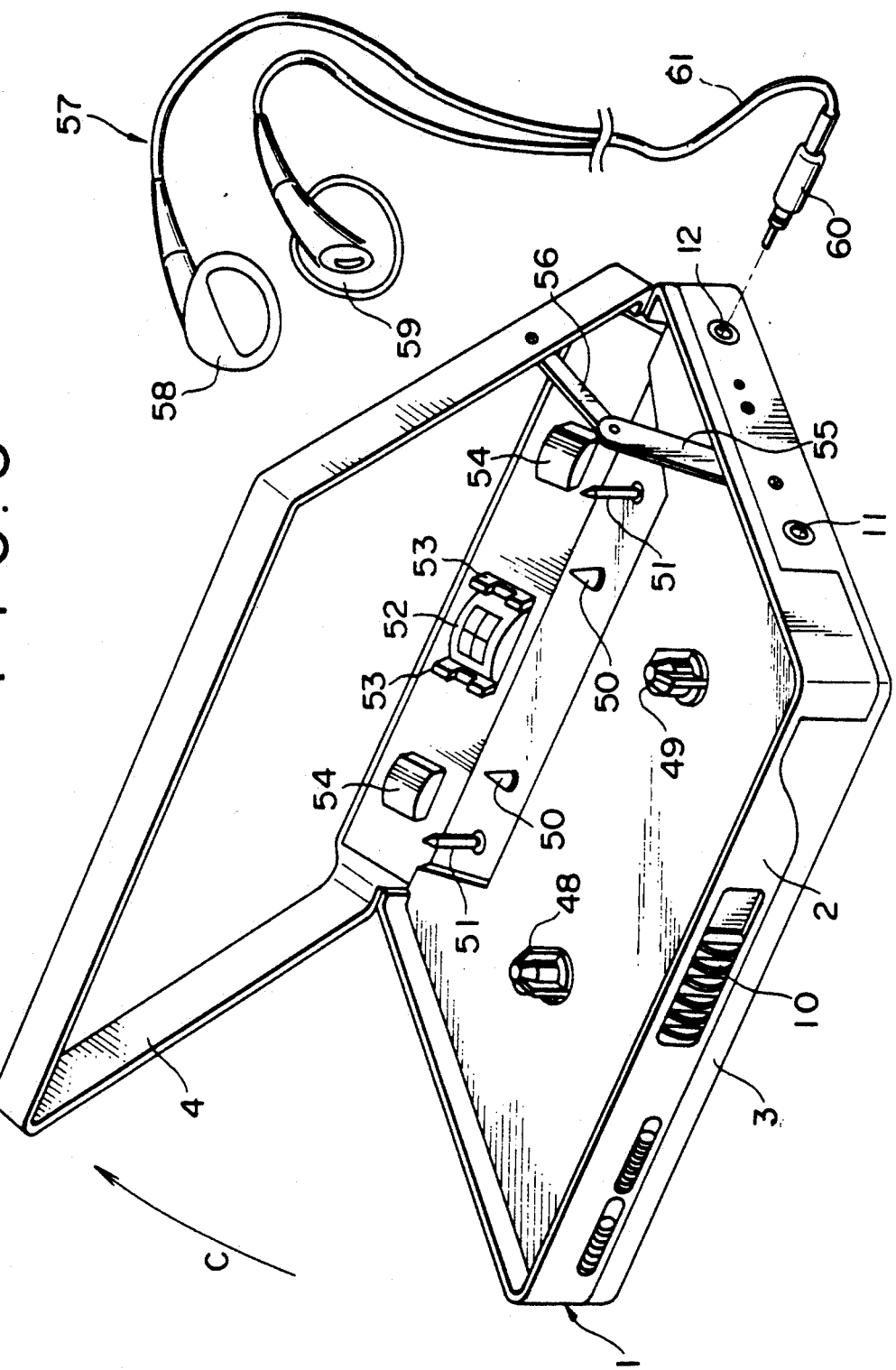
FIG. 8 is a perspective view of a tape cassette loading portion of the portable electronic device of FIG. 1.

Referring to FIG. 1, the sound reproducing device has a main unit 1 having a case consisting of a chassis 2, a front panel 3 attached to the front side of the chassis 2, and a cassette cover 4 attached to the rear side of the chassis 2. The front panel 3 is fastened to the chassis 2 with screws. The cassette cover 4 is hinged to the chassis 2 as shown in FIG. 8 so as to be turned on its one side between a closed position shown in FIG. 1 and an open position shown in FIG. 8. When closed, the cassette cover 4 is latched by a latching mechanism, not shown. In opening the cassette cover 4, a release key 10 is operated to unlatch the cassette cover 4. A cassette chamber is defined by the chassis 2 and the cassette cover 4. A pair of reel driving shafts 48 and 49 project from the bottom wall of the chassis 2 into the cassette chamber. When a tape cassette, not shown, is loaded into the cassette chamber, the reels of the tape cassette engage the reel driving shafts 48 and 49, respectively. The reel driving shafts 48 and 49 are driven for rotation by a motor mounted on the chassis 2 to rotate the reels. A pair of capstans 51 and a pair of cassette positioning pins 50 project into the cassette chamber from the rear portion of the bottom wall of the chassis 2. The cassette positioning pins 50 engages positioning holes of the tape cassette to position the cassette in the cassette chamber. The capstans 51 are driven for rotation by a motor mounted on the chassis 2 to feed a magnetic tape contained in the tape cassette. A reproducing magnetic head 52 and a pair of pinch rollers 54 are provided on the inner surface of one side wall of the cassette cover 4. The reproducing magnetic head 52 is set in sliding contact with the magnetic tape to read sound signals from the magnetic tape. The pinch rollers 54 are formed of a friction material, such as rubber. The pinch rollers 54 press the magnetic tape against the capstans 51 to ensure the magnetic tape feed operation of the capstans 51. A pair of tape guide members 53 each having a central recess is disposed on the opposite sides of the reproducing magnetic head 52 to position the magnetic tape relative to the reproducing magnetic head 52. The chassis 2 and the cassette cover 4 are connected by pivotally joined links 55 and 56 to limit the opening range of the cassette cover 4.

As shown in FIG. 1, a plurality of operating buttons 6, i.e., a rewinding button (REW), a fast feed button (FF), a stop button (STOP) and a reproducing button (PLAY), are arranged in a line substantially in the central portion of the front panel 3. When the reproducing button 6 is pushed, the sound reproducing device operates in a reproducing mode, in which the capstans 51 feed the magnetic tape at a normal speed in the normal direction and the reproducing magnetic head 52 reads sound signals from the magnetic tape. When the fast feed button 6 is pushed, the sound reproducing device operates in a fast feed mode to feed the magnetic tape in the normal direction at an increased speed. When the rewinding button 6 is pushed, the sound reproducing device operates in a rewinding mode to feed the magnetic tape in the reverse direction at an increased speed. When the stop button 6 is pushed, the the reproducing mode, the fast feed mode or the rewinding mode are cancelled and the operation of the sound reproducing device is stopped.

Figure 4:
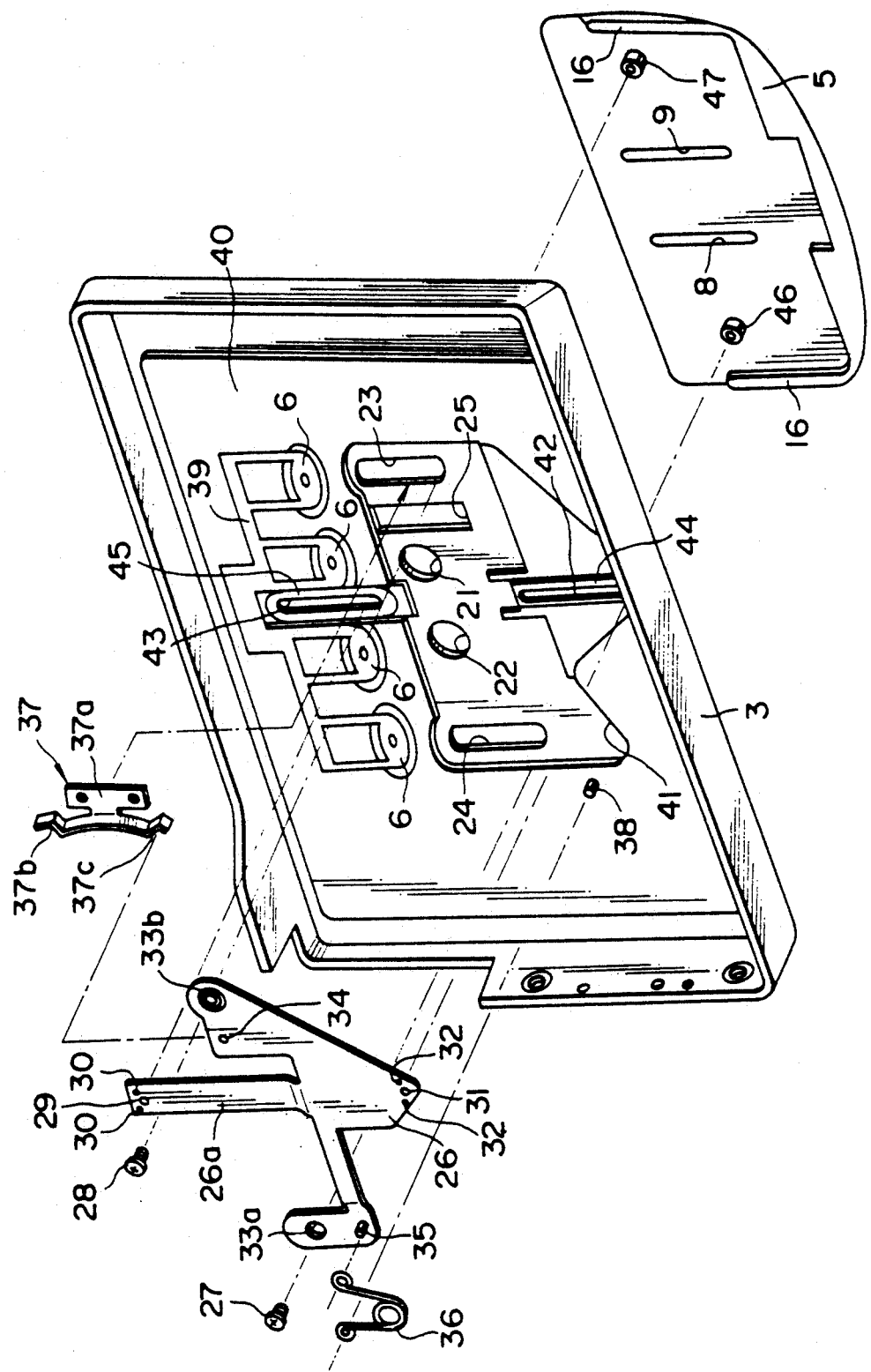
FIG. 4 is an exploded perspective view of the front panel assembly of FIG. 3, showing the inner side of the front panel assembly.

Referring to FIG. 4, the operating buttons 6 are held in a depressible state on the front panel 3 by button holding member 39 formed of a flexible material, such as a rigid resin, and attached to the inner surface of the front panel 3. When the operating buttons 6 are depressed into the front panel 3, electric contacts formed on a printed wiring board, not shown, provided in the chassis 2 are connected.

When the reproducing button 6 is pushed after putting a tape cassette in the cassette chamber and closing the cassette cover 4, the magnetic tape is fed in the normal direction and the reproducing magnetic head 52 reads sound signals from the magnetic tape. Then, the sound signals are converted into corresponding electric signals and the electric signals are transferred to output jacks 11 and 12 provided on the side wall of the chassis 2. As shown in FIG. 8, a headset 57, i.e., an electroacoustic transducer, is connected to the output jack 11 or 12. The headset 57 consists of an input plug 60, and a pair of headphones 58 and 59 connected to the input plug 60 by a cord 61. The input plug 60 is plugged in the output jack 11 or 12 to feed the electric signals to the headphones 58 and 59. Then, the headphones 58 and 59 converts the electric signals into corresponding sounds. In the fast feed mode and the rewinding mode, the sound reproducing device feeds the magnetic tape at an increased speed to enable quick search for a desired portion of the magnetic tape.

Figure 2:
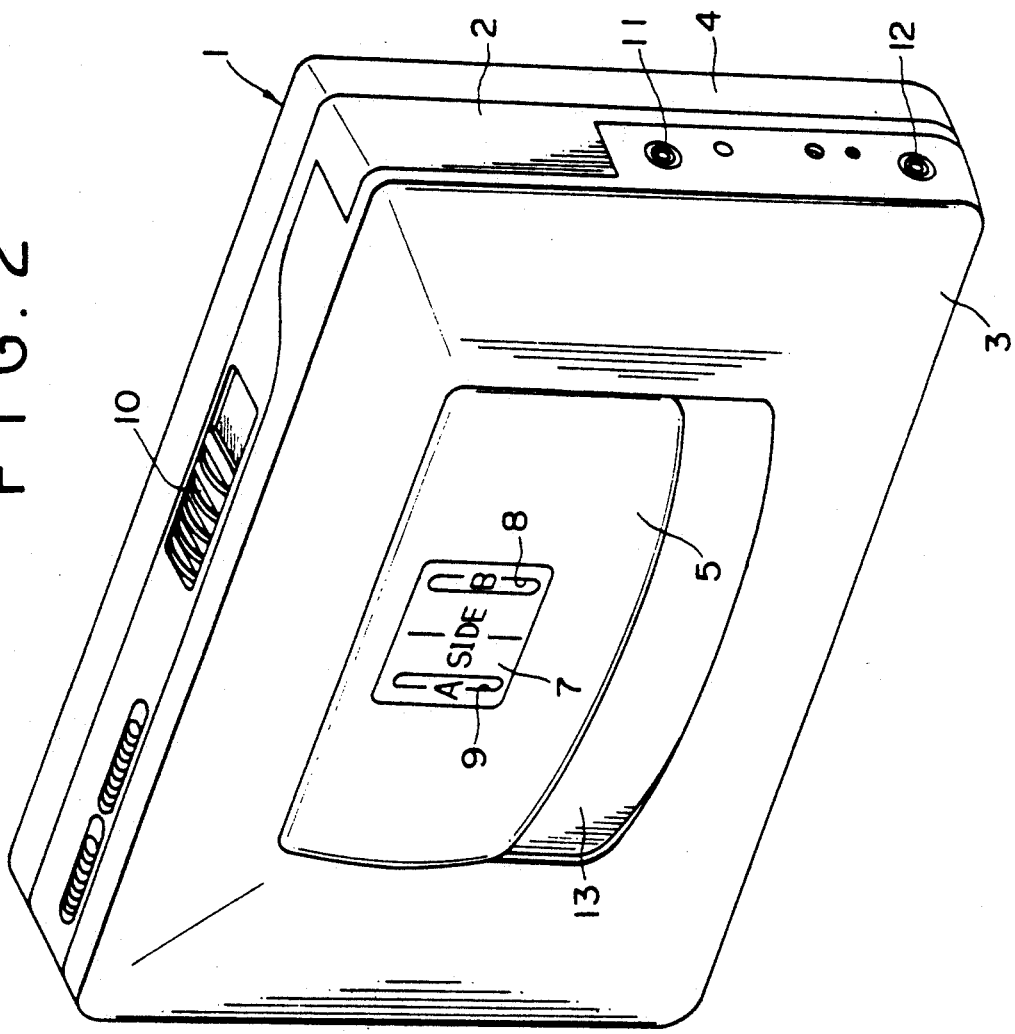
FIG. 2 is a perspective view of the portable electronic device of FIG. 1 in a hold state.

A sliding cover 5 is attached slidably to the front panel 3. The sliding cover 5 is able to slide between a second position shown in FIG. 1 and a first position shown in FIG. 2 in directions perpendicular to a line on which the operating buttons 6 are arranged. The sliding cover 5 is retained at the first position to cover the operating buttons 6 as shown in FIG. 2, or at the second position to expose the operating buttons 6 as shown in FIG. 1.

Figure 3:
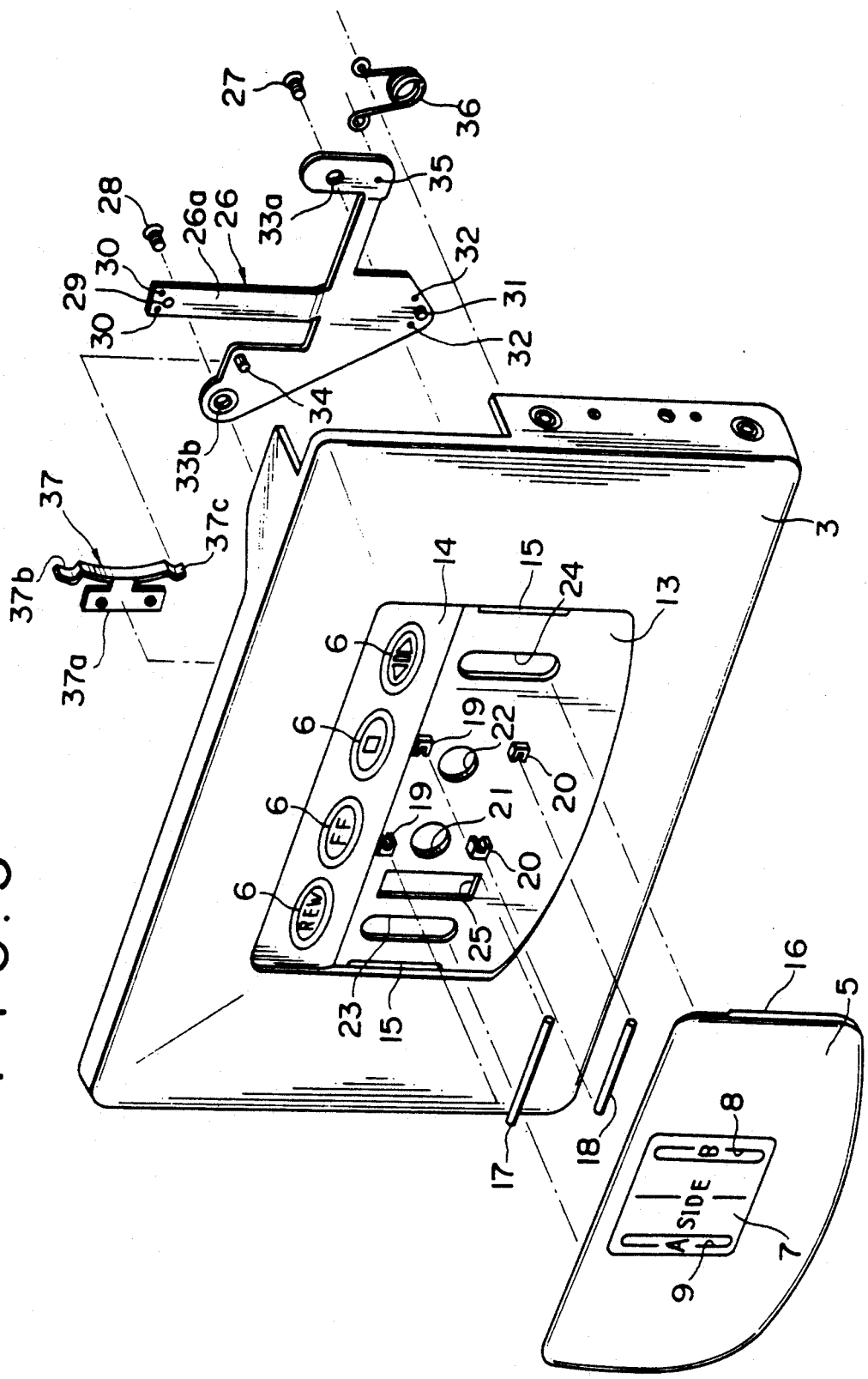
FIG. 3 is an exploded perspective view of a front panel assembly, which is an essential component, of the portable electronic device of FIG. 1.

Referring to FIGS. 3 and 4, the sliding cover 5 is provided with a pair of internally threaded studs 46 and 47 on its inner surface. The sliding cover 5 is put on the front panel 3 with the studs 46 and 47 received respectively in parallel slots 23 and 24 formed vertically, as viewed in FIG. 3, in the front panel 3. A pair of screws 27 and 28 are inserted through a pair of holes 33a and 33b formed in a holding plate 26 placed on the inner surface of the front panel 3 and screwed in the internally threaded studs 46 and 47 of the sliding cover 5 to hold the sliding cover 5 slidably on the outer surface of the front panel 3.

A pair of windows 21 and 22 are formed substantially in the central portion of the front panel 3. Light emitted by a pair of pilot lamps, not shown, for indicating the direction of travel of the magnetic tape, provided on the chassis 2 is transmitted through the windows 21 and 22. The pilot lamps are light emitting diodes or the like. A pair of parallel slots 8 and 9 of a length corresponding to the stroke of the sliding cover 5 are formed in the sliding cover 5 so as to extend along the sliding direction of the sliding cover 5 at positions respectively corresponding to the windows 22 and 21. Thus, the light emitted by the pilot lamps can be seen through the windows 21 and 22 and the slots 9 and 8.

A pair of guide pins, i.e., a first guide pin 29 and a second guide pin 31, are fixed to the holding plate 26 so as to project toward the front panel 3. Each of the guide pins 29 and 31 is substantially at equal distance from the holes 33a and 33b. The guide pins 29 and 31 are arranged on a line perpendicular to a line passing the holes 33a and 33b.

A flat guide plate 40 is attached to the inner surface of the front panel 3. The guide plate 40 is provided with an opening 41 corresponding to an area on the front panel 3 in which the slots 23 and 24 and the windows 21 and 22 are formed, and a pair of guide grooves 43 and 42 extending in the sliding direction of the sliding cover 5 to guide the guide pins 29 and 31, respectively, when the holding plate 26 slides together with the sliding cover 5. The guide pins 29 and 31 guide by the guide grooves 43 and 42 prevent the tilt of the sliding cover 5 and the holding plate 26 from the sliding direction to ensure smooth sliding movement of the sliding cover 5.

Figure 7:
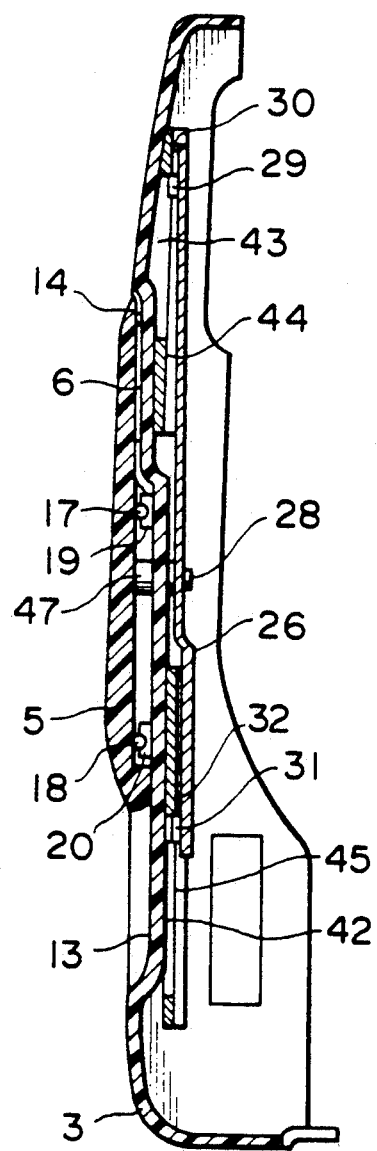
FIG. 7 is an enlarged longitudinal sectional view of the front panel assembly of FIG. 3.

Referring to FIGS. 3, 4 and 7, a pair of U-shaped supports 19 and a pair of U-shaped supports 20 are formed on the outer surface of the front panel 3 in an area covered with the sliding cover 5. A contact rod 17 having a cylindrical shape and smooth surface is supported at its opposite ends by the pair of supports 19, and a contact rod 18 having a cylindrical shape and smooth surface is supported at its opposite ends by the pair of supports 20. The contact rods 17 and 18 are in sliding contact with the inner surface of the sliding cover 5 to enable the sliding cover 5 to slide smoothly. A pair of parallel sliding ridges 16 formed in the opposite lateral ends of the sliding cover 5 so as to protrude toward the front panel 3 are received in a pair of parallel guide grooves 15 formed in the outer surface of the front panel 3, so that the sliding cover 5 is unable to tilt from the sliding direction thereof.

The holding plate 26 is provided with a pair of sliding projections 30 formed on the opposite sides of the first guide pin 29 so as to project toward the front panel 3, and a pair of sliding projections 32 formed on the opposite sides of the second guide pin 31 so as to project toward the front panel 3. The pair of sliding projections 30 and the pair of sliding projections 32 slide respectively along a pair of flat rails 45 and a pair of flat rails 44 formed on the guide plate 40. The pair of flat rails 44 are formed along and on the opposite sides of the guide groove 42, and the pair of flat rails 45 are formed along and on the opposite sides of the guide groove 43. The sliding projections 30 and 32 and the flat rails 44 and 45 reduce the frictional resistance against the sliding movement of the holding plate 26 to enable the holding plate 26 to slide smoothly.

Figure 5:
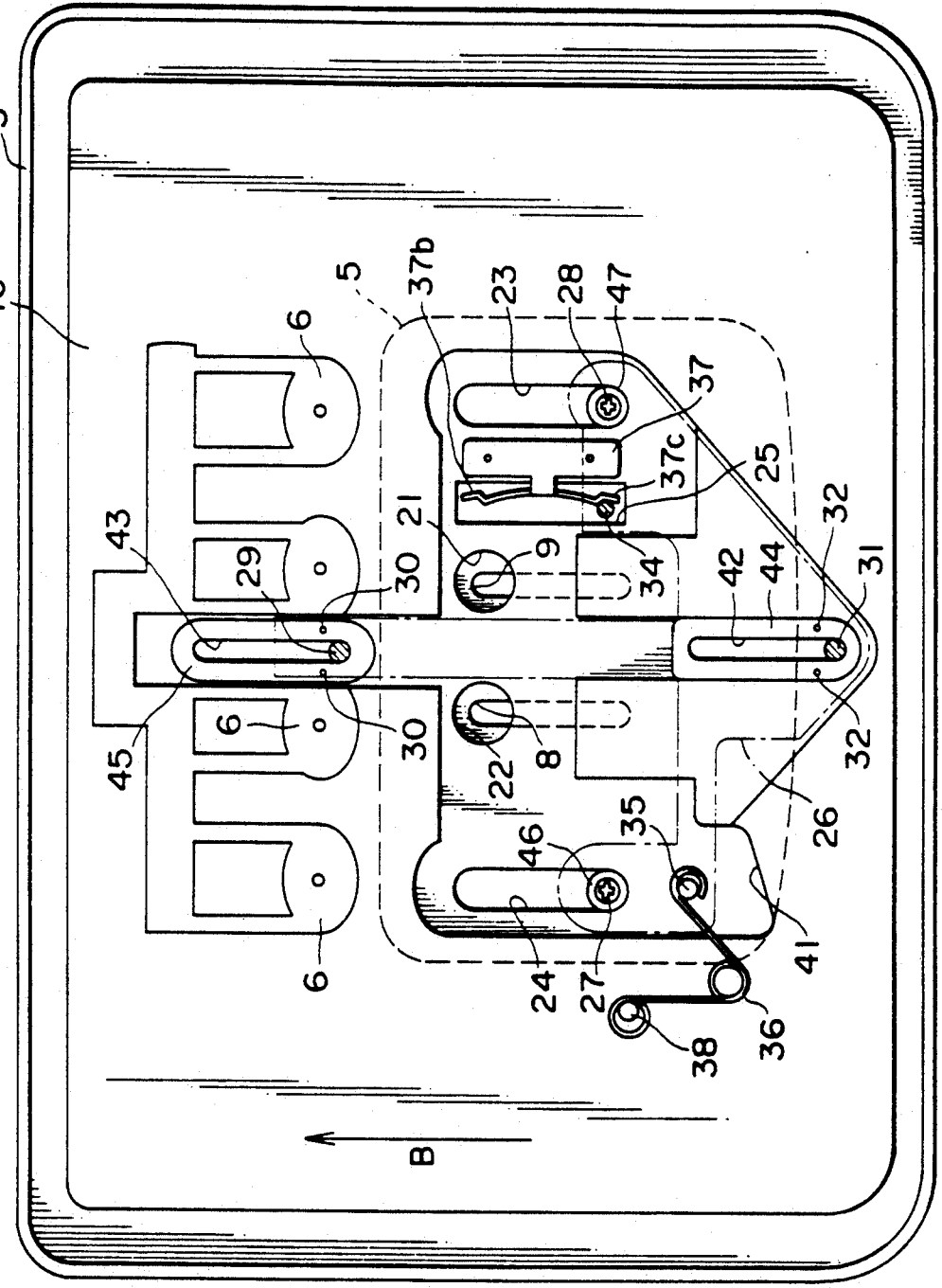
FIG. 5 is an enlarged front view of the inner side of the front panel assembly of FIG. 3.
Figure 6:
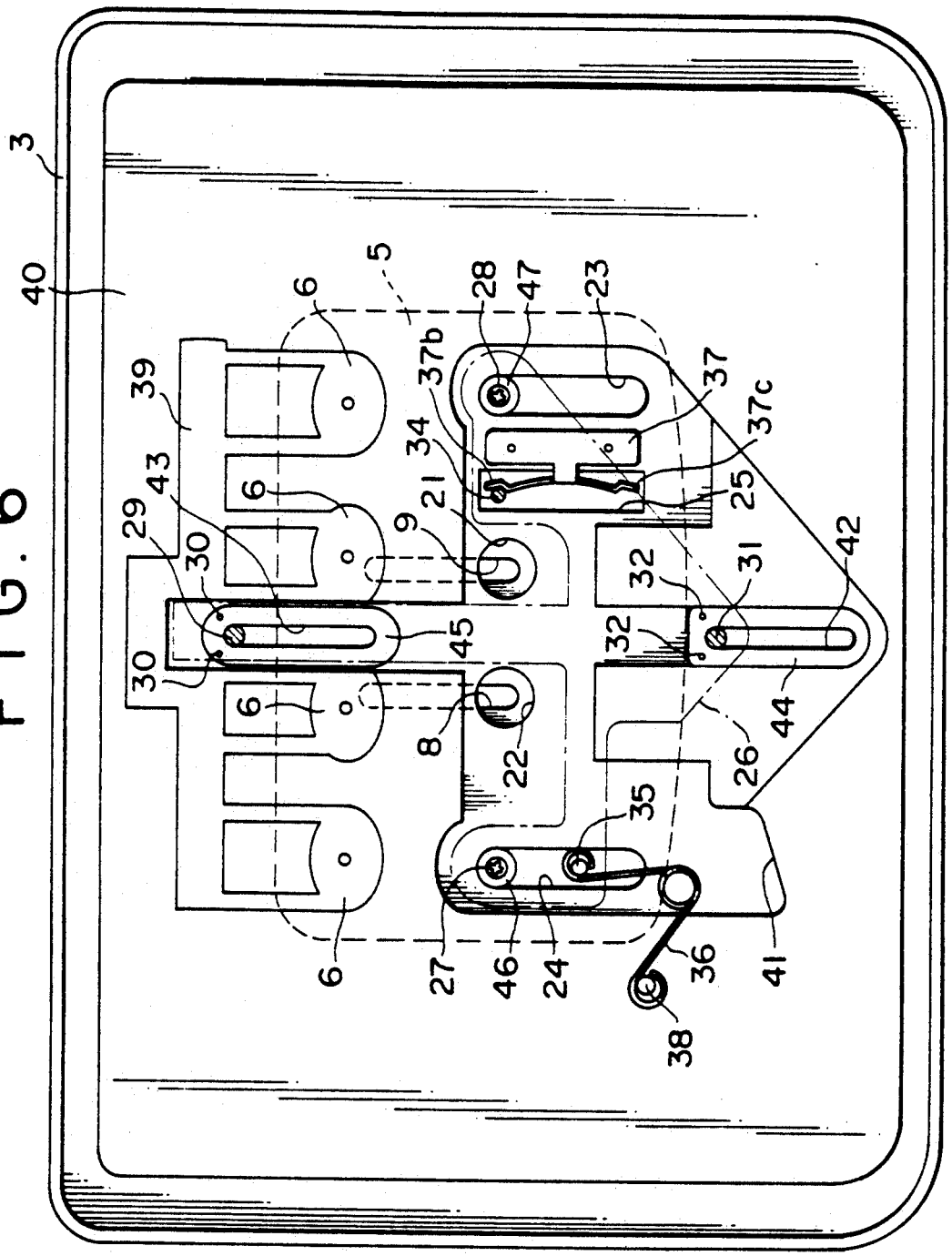
FIG. 6 is an enlarged front view of the inner side of the front panel assembly when the portable electronic device is in a hold state.

Referring to FIGS. 3 to 6, the sound reproducing device is provided with a torsion coil spring 36 and a plate spring 37, which serve as a holding means. The plate spring 37 is attached to the inner surface of the front panel 3 at a position corresponding to one side end of the holding plate 26. The plate spring 37 has, in an integral piece, a rectangular base portion 37a fastened to the front panel 3, and a flexible portion having an upper raised end 37b and a lower raised end 37c, which are bent int he shape of a crank. A stopper pin 34 is fixed to the holding plate 26 at a position corresponding to the flexible portion of the plate spring 37. The stopper pin 34 engages the upper raised end 37b of the plate spring 37 as shown in FIG. 6 when the sliding cover 5 is at the first position, and engages the lower raised end 37c of the plate spring 37 as shown in FIG. 5 when the sliding cover 5 is at the second. Thus, the elastic portion of the plate spring 37 holds the holding plate 26 to retain the sliding cover 5 at the first position or the second position. The stopper pin 34 deforms the elastic portion of the plate spring 37 elastically and is disengaged from the lower raised end 37c of the plate spring 37 when the sliding cover 5 is shifted from the second position toward the first position. The stopper pin 34 is disengaged from the upper raised end 37b of the plate spring 37 when the sliding cover 5 is shifted from the first position toward the second position.

The torsion coil spring 36 has one leg resting on a first spring peg 38 fixed to the guide plate 40 and the other leg resting on a second spring peg 35 fixed to the holding plate 26. The respective positions of the first spring peg 38 and the second spring peg 35 are determined so that the torsion coil spring 36 is stained to a maximum when the sliding cover 5 is at the middle between the first and second positions. The torsion coil spring 36 urges the sliding cover 5 and the holding plate 26 resiliently toward either the first position or the second position when the sliding cover 5 is at a position between the first and second positions.

When the sliding cover 5 is moved to the first position as shown in FIGS. 2 and 6, the sliding cover 5 covers the operating buttons 6 to maintains the sound reproducing device in a hold state, in which the operating buttons 6 cannot be operated and the operating mode of the sound reproducing device cannot be changed. Since the operating buttons 6 are covered with the sliding cover 5, it is possible to recognize distinctly that the sound reproducing device is in the hold state.

When the sliding cover 5 is moved to the second position as shown in FIGS. 1 and 5, the operating buttons 6 are exposed to enable the operation of the operating buttons 6 so that the hold state can be cancelled. Since the operating buttons 6 are exposed, it is possible to recognize distinctly that the sound reproducing device is not in the nonhold mode.

The sliding cover 5 may serve also as a switching means capable of setting the sound reproducing device in an electrical hold state, namely, a switching means capable of electrically disconnecting the control switches operated by the operating buttons 6 from the electronic circuit mounted on the chassis 2. It is effective to set the sound reproducing device in the electrical hold state particularly when the sound reproducing device is provided with remote control switches connected in parallel with the control switches operated by the operating buttons 6, respectively, because the operation of the remote control switches are invalid when the sound reproducing device is set int he electrical hold state.

The present invention is not limited to the sound reproducing device in its practical application; the present invention is applicable also to various portable electronic devices including sound recording/reproducing devices, radio receivers, television receivers, video tape recorders and video cameras.

Although the invention has been described in its preferred from with a certain degree of particularity, obviously many changes and variations are possible therein. It is therefore to be understood that the present invention may be practiced otherwise than as specifically described herein without departing from the scope and spirit thereof.

What is claimed is:

1. A portable electronic device comprising a case containing an electronic circuit assembly and having a front panel, a plurality of operating buttons for operating control switches for controlling the electronic circuit assembly, supported on the front panel, the improvement comprising:

a sliding cover assembly slidably provided on the front panel, provided with a pair of guide pins, and capable of being shifted between a first position to cover the operating buttons and a second position to expose the operating buttons;

a guide plate provided with a pair of guide grooves for guiding the guide pins of the sliding cover assembly, extending along the sliding direction of the sliding cover assembly; and a retaining means for retaining the sliding cover assembly at the first position or the second position.

2. A portable electronic device according to claim 1, wherein said sliding cover assembly comprises: a sliding cover slidably put on the outer surface of the front panel so as to be shifted between the first position and the second position; and a holding plate slidable put on the inner surface of the front panel, fastened to the sliding cover for sliding movement together with the sliding cover provided with the pair of guide pins guided by the pair of guide grooves of the guide plate, respectively.

3. A portable electronic device according to claim 2, wherein said front panel is provided with a pair of through holes at positions corresponding to light emitting elements included in the electronic circuit assembly to enable the visual recognition of light emitted by the light emitting elements from outside the case, and the sliding cover is provided with a pair of slots framed at positions corresponding to the through holes of the front panel so that the light emitted by the light emitting elements can be visually recognized form outside the case regardless of the position of the sliding cover.

4. A portable electronic device according to claim 3, wherein the front panel is provided on its outer surface with two pairs of supporting projections, and a pair of sliding contact rods having smooth surfaces are supported at their opposite end son the tow pairs of supporting projections, respectively, so as to be in sliding contact with the inner surface of the sliding cover.

5. A portable electronic device according to claim 3, wherein said retaining means comprises: a plate spring member having a base portion fastened to the inner surface of the front panel, and an elastic retaining portion having first and second retaining ends; and a stopper pin attached to the holding plate so as to deform the elastic retaining portion when the holding plate is moved together with the sliding cover between the first and second positions, to engage the first retaining end of the elastic retaining portion elastically to retain the sliding cover assembly at the first position when the sliding cover assembly is shifted to the first position, and so as to engage the second retaining end of the elastic retaining portion elastically to retain the sliding cover assembly at the second position when the sliding cover assembly is shifted to the second position.

6. A portable electronic device according to claim 5, wherein said retaining means further comprises a torsion coil spring for resiliently urging the sliding cover assembly toward either the first position or the second position when the sliding cover assembly is at a position between the first and second positions.

* * * * *

UNITED STATES PATENT AND TRADEMARK OFFICE
CERTIFICATE OF CORRECTION

PATENT NO. : 5,249,102
DATED : September 28, 1993
INVENTOR(S) : Yoshio Ogawa, Kouzou Takahashi, Hitoshi Isoda and Toshio Arai It is certified that error appears in the above-indentified patent and that said Letters Patent is hereby corrected as shown below:

On the title page, item [54] and column 1, line 2, change "Electric" to --Electronic--

Col. 5, line 48, change "int he" to --in the--

Col. 6, line 3, change "stained" to --strained--
       line 12, change "maintains" to --maintain--
       line 39, change "int he" to --in the--
       line 48, change "from" to --form--

Col. 7, line 9, change "slidable" to --slidably--
Col. 8, line 2, change "end son" to --ends on-- and change "tow" to --two--

Signed and Sealed this

Second Day of August, 1994

Attest:

BRUCE LEHMAN

Attesting Officer

Commissioner of Patents and Trademarks